Nov. 10, 1936.  O. ERNST  2,060,615
VENTILATING WINDOW FOR AUTOMOBILES
Filed Oct. 29, 1932  2 Sheets-Sheet 1
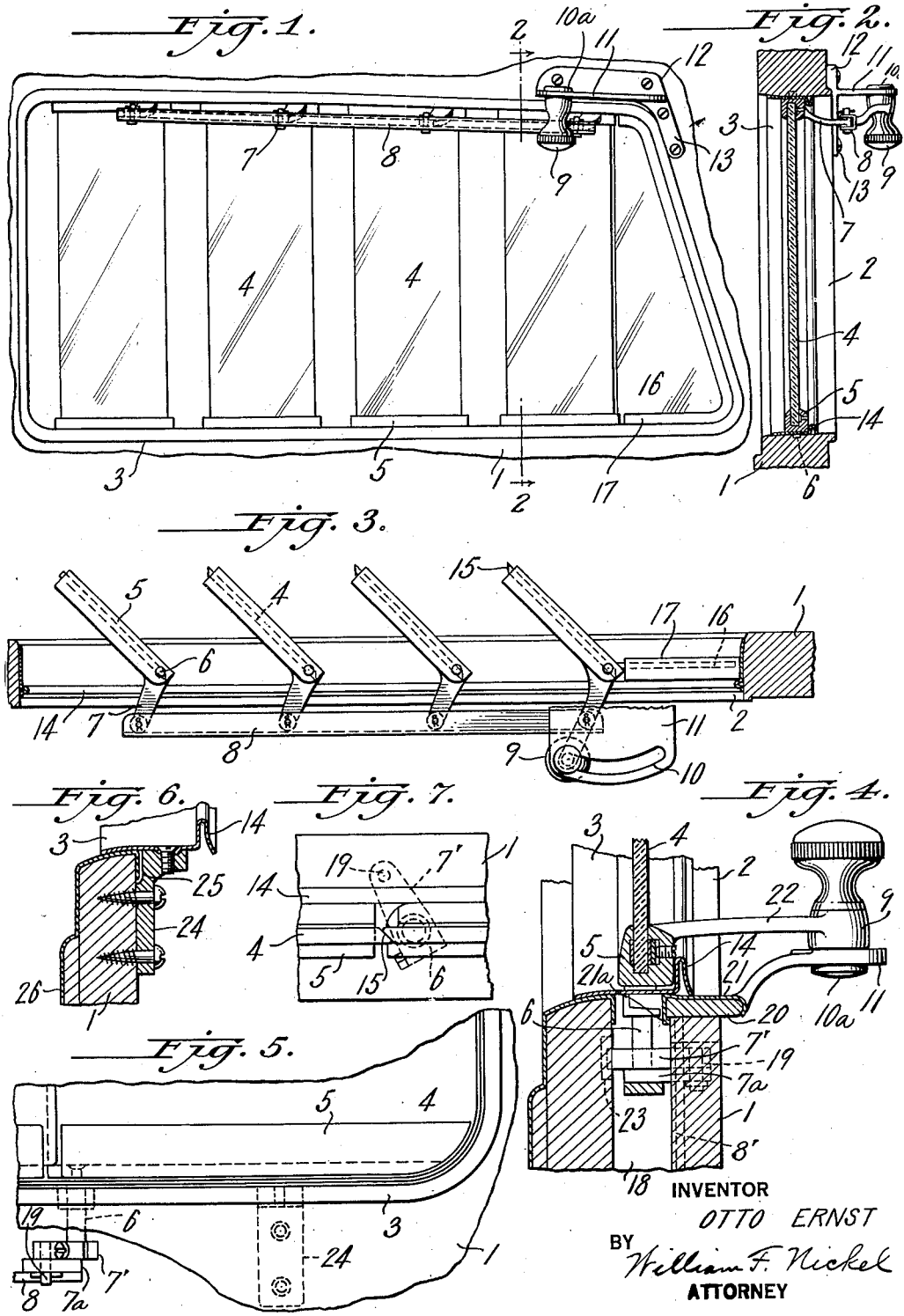
INVENTOR
OTTO ERNST
BY William F. Nickel
ATTORNEY

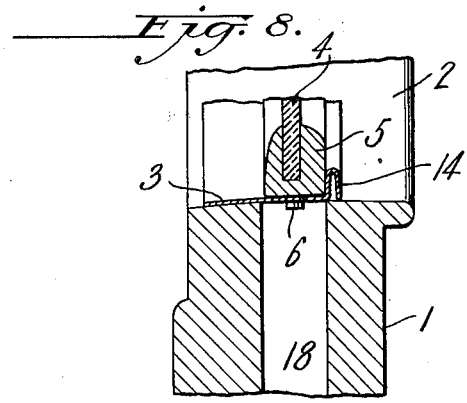
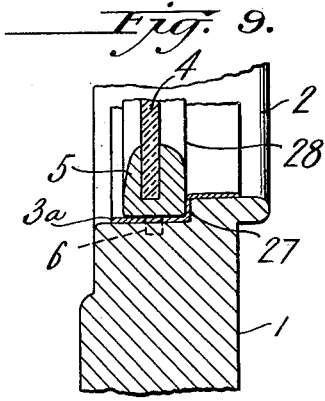
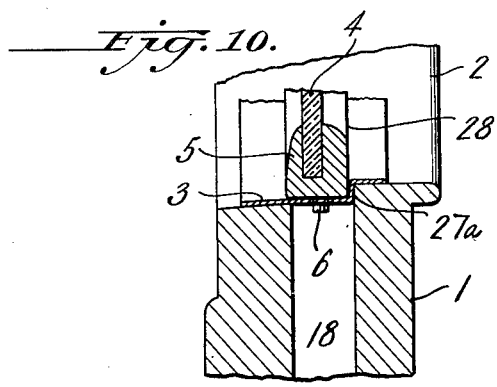
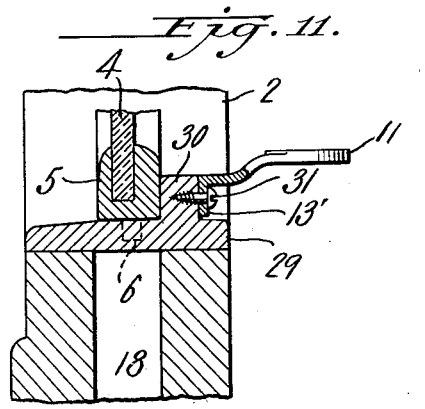
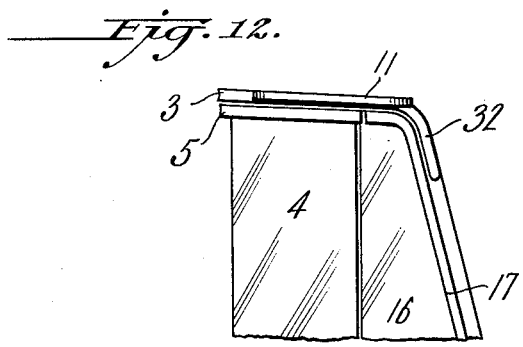

Patented Nov. 10, 1936

2,060,615

UNITED STATES PATENT OFFICE 2,060,615

VENTILATING WINDOW FOR AUTOMOBILES

Otto Ernst, Larchmont Manor, N. Y.

Application October 29, 1932, Serial No. 640,230

4 Claims. (Cl. 98—2)

My invention relates to windows for vehicles, such as closed-in automobiles, and particularly windows that can be shut at will, and opened wholly or partly to ventilate the interior of the vehicle.

In my Patent No. 1,840,026 for improvements in automobiles, granted January 5, 1932, I show and describe a window that is designed to facilitate the circulation of the air into and out of the vehicle, without subjecting the occupants to a direct draft. The air in the vehicle is thus kept pure and wholesome, and the interior comfortable, and at the same time all risk of any of the occupants catching cold or contracting some other illness is obviated. These ends are gained by an arrangement of glass panels mounted one behind the other in one or more of the window spaces at the sides of the vehicle, and rotatable on vertical axes at the forward edges of the panels; that is, the edges towards the front of the car. The windows can thus be opened as much as desired by swinging the panels outward and secured by suitable means in adjusted position.

An object of the present invention is to provide a stronger and more durable construction of this character which is simple and easy to install and remove when not required, and capable of long service without loosening or derangement of any of the parts.

A further object of the invention is to provide a window of this design comprising a suitable frame with a number of panels therein pivoted and connected to be moved in unison to open or closed positions; and to make the entire window in the form of a self-contained unit including a frame which carries the panels and is adapted to fit a window opening now usually closed by a window pane of a different variety. Such a device can be readily mounted in the window opening of virtually any type of closed car, with little or no interference with the vertically slidable window panes now widely used in the doors and sides thereof.

With the above and other objects and advantages in view, the invention comprises the novel features set forth in the ensuing description and the accompanying drawings and especially pointed out in the appended claims; but the disclosure is explanatory only and changes in various structural details may be made without departing from the principle of the invention or exceeding the scope and spirit thereof.

On the drawings:

Fig. 1 is a side view of an improved ventilating window according to my invention;

Fig. 2 is a vertical section through same on the line 2—2 of Fig. 1;

Fig. 3 is a horizontal section with some parts shown in plan;

Figs. 4, 5, 6 and 7 are respectively a vertical section, a side view, another vertical section and a plan view of details of another construction;

Figs. 8, 9, 10 and 11 are vertical sectional views through a portion of a window according to this invention showing other modifications; and Fig. 12 is an elevation of a detail of the invention according to Fig. 1, but illustrating another method of mounting one of the operating parts.

On the drawings the same numerals identify the same parts throughout.

Referring first to Figs. 1, 2 and 3, I show at 1 a portion of a door or side of an enclosure such as the body of an automobile having a window opening 2. Instead of closing this window opening with a pane of glass which can be moved up and down or is fixed therein, I provide a frame 3 which has the same outline as the opening, to fit inside of it and be secured in place in any suitable manner. In this frame are several panels or panes of glass 4 set in reinforcing members 5 which are grooved to receive the top and bottom edges of the panes, these members being affixed to the panes and pivoted by means of journals 6 engaging bearing apertures in the top and bottom of the frame 3. The journals on the members 5 for each panel 4 are in line with the front edges of the panel and when the panes are turned to swing about these axes, their rear edges move away from the wall 1 towards the exterior of the enclosure. As the vehicle carrying this window moves ahead, the air strikes the outer faces of the panels 4 and is deflected away from the car and the air inside will be drawn out between the panels. Thus the air in the compartment will be renewed and kept fresh but without subjecting the occupants to any drafts or discomfort.

The top members 5 at each pivot will be provided with an arm 7 which projects towards the inside of the compartment, and these arms will be pinned at their outer ends to a link 8 connected to a knob 9 having a projection which enters a slot 10 in a plate 11. This knob may be mounted on either the link, or upon the extended end of one of the arms 7, as shown in Fig. 3. This plate has projections 12 and 13 to enable it to be fixed to the inside of the wall 1 adjacent the edge of the window; and when the knob is moved, it pulls or pushes upon the link 8 to swing the window panels to opened or closed position. The end of the knob 9 which passes through the slot 10 may fit this slot tightly so that friction between the knob and the slot will be sufficient to hold the knob and the panes 4 in adjusted position. If desired the end of the knob upon the plate 11 may be internally threaded to receive a flanged or headed pin 10a to hold the knob positively in the slot and prevent disengagement therefrom.

The frame 3 may be made of any suitable material, and I have illustrated it as being of metal and stamped to form a stiffening and reenforcing rib 14 adjacent the edge towards the interior of the compartment and extending all round the inside of the frame. This rib provides a shoulder against which the members 5 abut when the panes are closed. The front and rear edges of the panes 4 may be bevelled as shown at 15 so that when the panes are shut and in alinement against the shoulder 14, no interstices will be left between them.

This unit can be constructed to fit any automobile window, for instance, whether the front and rear edges of the opening 2 are vertical or not. If the front edge is inclined, this part of the window opening will be provided with a fixed pane 16 having a reenforcing member 17 along the top, front and bottom edge and affixed to the inside of the frame adjacent the shoulder 14 in stationary position. This member 17 will be the same in thickness and cross-section as the members 5. The rear edge of this pane 16 will be bevelled like the panes 4.

This construction can be very easily manufactured and finished at low cost, because the frame can be very readily made, the window panes 4 mounted therein and the link 8 attached to the arms 7 and the whole device can then be placed inside of a window opening and secured as by screws to the inside of the wall 1 around the opening 2. When the frame is in the window opening at the driver's seat, the plate 11, being above the opening 2, that is, near the roof of the compartment, does not interfere with the driver's hand on the steering wheel. The panes when open allow sufficient space for the driver to put out his hand to signal a stop or turn.

A frame as described with panels 4 can be mounted in one or more window openings on a closed automobile, but usually one at the left of the driver is sufficient. Such a window can also be utilized on airships, marine vessels, railway coaches and even in stationary dwellings.

A slightly different construction is shown in Figs. 4, 5, 6, and 7 wherein the same frame 3 can be set inside of a window opening 2 on an automobile having in the door or wall thereof below said opening a space 18 for the usual vertically moving window pane. This pane can be taken out; and the lower journals 6 of the panels 4 are made longer to pass through the bottom of the frame 3 into the space 18; and adjacent their lower ends they are provided with laterally extending arms 7' joined at their outer ends by pins 19 to arms 7a which are fixed to a link 8 in the space 18. This link extends across the space 18 the entire width of the window; so that when one panel 4 is turned all the rest will turn with it. The space 18 may be enlarged at 23 on both sides where the arms 7' and 7a are located. Instead of the knob 10 being at the top, it is at the lower part of the window and is connected by an arm 22 to the bottom member 5 of one panel 4. The plate 11' bearing the slot for the knob is secured to a piece of molding 20 forming the inner half of the sill, by an extension 21 which is clamped to the edges of the molding, one edge 21a of this extension projecting beneath the molding on its inner edge, so that it cannot be displaced. The frame 3 rests upon this extension 21, which may be as long as the sill itself or of less length, if desired.

The frame is secured in place by means of angle-shaped fastening elements 24 affixed to the wall 1 inside of the space 18 as shown in Figs. 5 and 6, the frame 3 being screwed to the top arms of the fastening elements. These members may be recessed at 25 to receive the inturned edge of the metal shell 26 or covering on the outside of the automobile. The arm 22 is of course adjacent the lower pivot 6.

If desired the knob 9, in Fig. 4, may be placed at the top of the window frame as shown in Fig. 1, together with the plate 11'.

Fig. 8 shows how the window frame of Figs. 1, 2, and 3 may be set into the window opening 2 of an automobile door or side wall which has the usual window pane that can be moved up and down. In this instance the pane of glass in the slot 18 need not be taken out. It need only be actuated to lowermost position.

In Fig. 9 the frame 3a is shown made of metal as before, but the wall 1 has a window opening 2 therein with a surrounding inside shoulder 27 and the frame 3a has a corresponding outside shoulder 28 so that the frame fits the inside of the window opening 2. The plate 11 will be located at the top of the window as before or it can be mounted on the sill, if desired. This design is for windows that are like that of Fig. 2 and have no spaces 18 for panes of glass that move up and down; but are formed with an inside shoulder as at 27.

In Fig. 10 the window frame construction of Fig. 9 is illustrated, but mounted in the window opening of a door or side of an automobile which has the usual space 18 therein for the vertically sliding window. The inner half of the window sill is higher to form the shoulder 27a. With the door or side of an automobile constructed in this fashion the usual sliding window or my window can be used at will simply by putting in and taking out the frame 3 with the panels 4. To insert the frame 3, the window in the space 18 is simply moved down as far as it will go.

In Fig. 11, I show a window opening 2 in the side of an automobile or door thereof having the space 18 as before, but here the frame 3 is made of wood 29 with a rib 30 around the inside to provide the shoulder for engagement by the members 5, when the window panels 4 are closed. The plate 11 is secured to the inner face of this rib as by screws 31 passing through a down turned portion 13'. The frame 29 may be as wide as the sill of the window opening 2 or of less with. It may be flat so as to fit a window opening with inside portions thereof flat as in Fig. 2 or of the same height at both sides of the space 18 as shown in Figs. 8 and 11 or it might be formed so that it can fit window openings with inside shoulders 27 or 27a as shown in Figs. 9 and 10. Also the plate 11 can be secured to the lower part of this frame or to the upper part as shown in Fig. 1.

In all of the views shown in Figs. 8, 9, 10 and 11, the knob 9 which engages the slot 10 in the plate 11 wherever this plate is attached is of course associated with a link 8 and arms 7 on the members 5.

Fig. 12 presents another modification of the same construction as in Figs. 1, 2 and 3 but showing the plate 11 affixed directly to the frame 3. This plate 11 can be secured by spot welding, for example, to the inside of the rib 14 and it may have an extension or flange 32 running part of the way down the front of this frame also spot welded thereto to hold the plate 10 more securely.

The construction of Fig. 11 can be of metal also if desired.

Having described my invention, what I believe to be new and desire to secure and protect by Letters Patent of the United States is:—

1. A window unit comprising a frame having a straight shoulder on the inside, said frame being adapted to fit the inside of a window opening, angle-shaped elements adapted to be mounted in a space below the opening and secure the frame therein, window panels in said frame, pivots in line with corresponding edges of said panels engaging the top and bottom of the frame to mount the panels therein, arms on said pivots within said space, a link in said space connecting said arms, an arm outside of said space for actuating one of the panels, a knob on said arm, a fixed plate having a slot to receive the one end of the knob, and an extension on said plate engaging the sill of the window opening and held in place by said frame.

2. A window unit comprising a frame to fit inside of a window opening, said frame having an inside rib, panels for the inside of said frame, pivots at the upper and lower ends of the panels, substantially in line with corresponding edges of the panels to mount the panels in the top and bottom of the frame adjacent said rib, a rigid arm connected to each panel, a link connected to said arms, a knob connected to said link and a plate having a slotted opening to receive one end of the knob, said plate being secured to a side of said rib.

3. A window unit comprising a metal frame having a rib extending around the interior thereof to form a shoulder, a plurality of window panels in the frame, pivots at the upper and lower ends of the panels substantially in line with corresponding edges to mount the panels in the top and bottom of the frame adjacent the rib and enable them to swing outward away from said rib, arms on each of said panels, a link connecting said arms, a knob on said link and a plate having a curved slot engaged by one end of said knob, said plate being spot-welded to a side of said rib.

4. A window unit for a vehicle comprising a frame having a straight interior shoulder, transparent panels in said frame, reinforcing members extending along the tops and bottoms of said panels and having grooves receiving the latter, journals on said members engaging the top and bottom of said frame adjacent the shoulder, a rigid arm projecting from one member of each panel, a link pinned to said arms, and means comprising a knob on one of the arms and a slotted plate in stationary position to operate the panels and hold them in adjusted position.

OTTO ERNST.